June 13, 1961 R. E. HARKINS 2,988,673
COMPENSATED ELECTROMAGNETIC DEVICES
Filed Jan. 14, 1957 2 Sheets-Sheet 1

INVENTOR.
Robert E. Harkins
BY Gerald B. Tjoflat
His attorney

June 13, 1961 R. E. HARKINS 2,988,673
COMPENSATED ELECTROMAGNETIC DEVICES
Filed Jan. 14, 1957 2 Sheets-Sheet 2

INVENTOR.
Robert E. Harkins
BY Gerald B. Tjoflat
His attorney

United States Patent Office 2,988,673
Patented June 13, 1961

2,988,673
COMPENSATED ELECTROMAGNETIC DEVICES
Robert E. Harkins, Orrville, Ohio, assignor to Hagen Corporation, Pittsburgh, Pa., a corporation of Pennsylvania
Filed Jan. 14, 1957, Ser. No. 634,028
7 Claims. (Cl. 317—131)

This invention relates to electromagnetic devices of the type employing a permanent type magnet and a coil winding that is variably energized.

Devices of the above type are affected by temperature changes in the permanent magnet. For example, if a constant current is maintained in the coil winding, the force developed by the coil decreases when the magnet temperature rises to elevated temperatures. In other cases, for example an electromagnetic tachometer having a permanent magnet field, the voltage output thereof falls off as the temperature of the magnet rises into a range where the magnet strength decreases.

It is therefore an object of the invention to provide an electromagnetic device of the above type with a resistor in the magnet body having a positive temperature coefficient of resistance and an external resistance circuit which includes the coil winding. The magnet resistor and the resistors of the external circuit are such that the current in one of the external resistors, and the voltage drop across this resistor, are so modified automatically that this current or voltage is proportional to the force of the coil winding.

Another object is to provide an external circuit which with the coil winding and the magnet temperature responsive resistor develop an output voltage that is unaffected by the change in strength of the magnet as its temperature rises.

A further object is to provide an external resistance circuit for a generator or the like having in its voltage output circuit a resistor whose resistance varies with temperature and functions in such a manner that the output is unaffected by changes in the permanent magnet strength.

A still further object of the invention is to provide an electromagnet having a magnet of the permanent type which is provided with a temperature compensating resistor imbedded in the iron structure.

The above and other objects will be apparent to those of ordinary skill in the art to which the invention pertains, taken in conjunction with the accompanying drawings.

Figure 1:
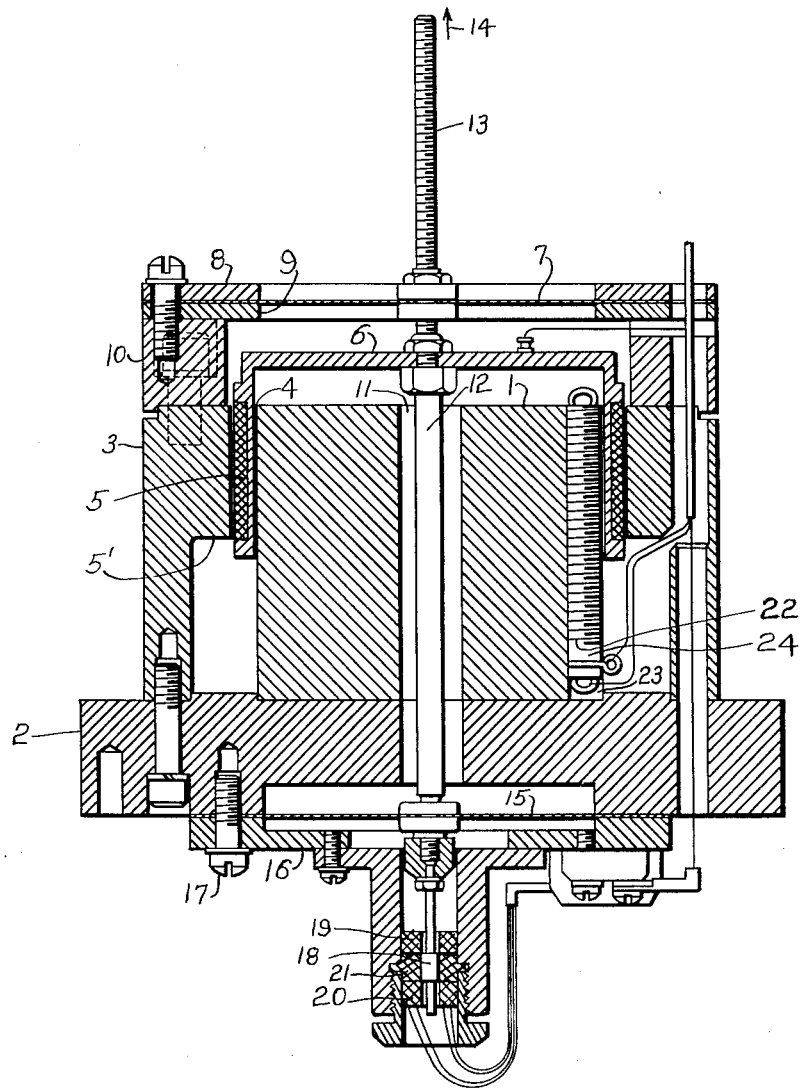
FIGURE 1 is a view in transverse section of an electromagnetic device provided with a temperature compensating resistor arranged in accordance with an embodiment of the invention.

In FIG. 1 of the drawings an electromagnetic device is shown that comprises a core 1 of permanent magnetic material, such as an Alnico alloy. The core is provided with a pole piece 2 which forms a base for the device and an external magnetic member 3 of cylindrical form which provides an air gap 4 between the upper end of the core 1 and a pole piece 5' of the member 3.

A coil winding 5, carried by a support member 6, is disposed in the air gap 4. The member 6 is supported by a flexible diaphragm 7 secured between clamping members 8 and 9 which are bolted to a spacer 10 which in turn is secured by screws to the member 3. The core 1 is provided with a central bore 11 through which a rod or link 12 extends. The upper end of the rod is secured to the member 6, as shown, and to the diaphragm 7. The link 12 extends upwardly to provide a threaded portion 13 to which an actuator, not shown, may be connected.

The actuator for rod 13 may be a pressure sensitive member or other device that responds to a variable condition to be measured, regulated or controlled. The force exerted on member 13 may be considered to act in the direction of arrow 14 and would be of variable magnitude. The force developed by the coil 5 when traversed by a current would be in the opposite direction so as to balance the upwardly acting force 14. The rod 12 also extends downwardly and is coupled to a flexible diaphragm 15, the marginal edge of which is clamped between a clamping member 16 and the member 2, the member 16 being secured to member 2 by means of screws 17. The rod 12 is provided with a movable core member 18 that operates within the field of coil windings 19, 20 and 21 which form a differential transformer. The winding 21 may be the input winding, and is energized from a source of voltage of fixed value. The windings 19 and 20 are differentially connected together and are in the field of the winding 21. As the core 18 moves upwardly or downwardly past the magnetic center of coil 21 more voltage is induced in coil 19 than in coil 20 or vice versa.

Figure 2:
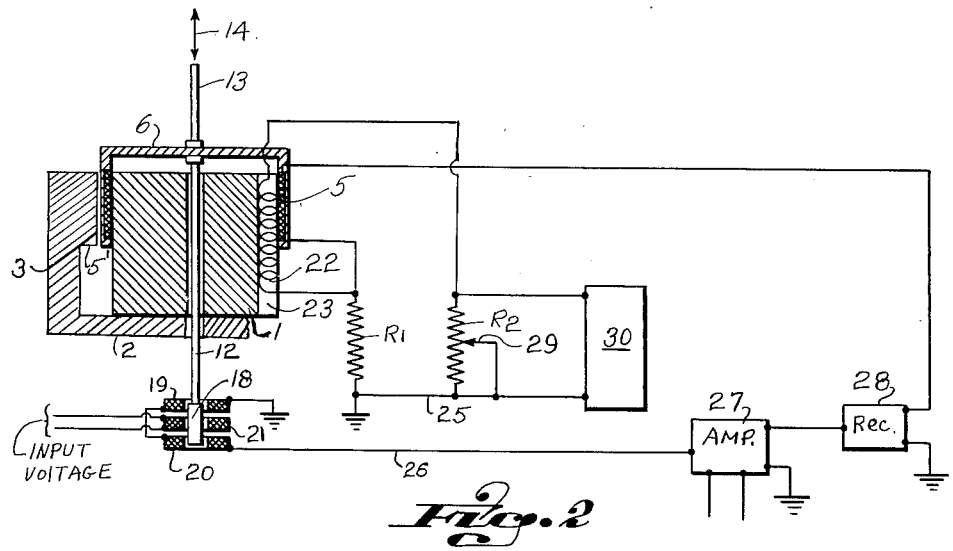
FIG. 2 is a more or less diagrammatic view of the device of FIG. 1 arranged in a circuit having such characteristics that changes in strength of the magnet are automatically compensated.

The output of the windings 19 and 20 are amplified, rectified and then fed back to the coil winding 5 as shown in FIG. 2.

In electromagnets of the type disclosed in FIG. 1 the current traversing the winding 5 tends to heat the permanent magnet, that is, the permanent magnet core 1. As the temperature of the magnet rises, it loses its strength; therefore, there will be times, especially when the core is in an elevated temperature range, when the force developed by the coil 5 for a given current input will not be the same as when the core 1 is cold or at a lower temperature. Therefore, the amount of current required to balance a given force will have to increase.

In order to compensate for changes in temperature of the magnet core 1, a resistor 22 is mounted in a relatively small opening 23 in the core 1. The resistor is in thermal conductivity with the core but is electrically insulated therefrom. As shown in FIG. 1, the resistor may be wound on a threaded member 24 which is screwed into the opening 23.

In order that the output of the electromagnetic device may be constant, even though the temperature of the core changes, an external resistance circuit is provided in which the resistor 22 is included. This resistor circuit comprises a resistance R1 and a resistance R2. The resistor 22 is connected across the upper terminals of resistors R1 and R2 while the opposite terminals thereof are connected by a conductor 25 to ground. Thus the resistors R1, R2 and 22 form a parallel circuit.

One terminal of coil winding 5 is connected to the junction between resistor R1 and resistor 22. The other terminal of the winding is connected to a rectifier associated with the differential transformer comprising the coils 19, 20 and 21. As shown in FIG. 2, the output of the coils 19 and 20 is transmitted through a conductor 26 to an amplifier 27. The output of that amplifier is rectified by a rectifier 28 and the rectified output is fed to the coil winding 5.

The resistor R1 may have a value of approximately 200 ohms, the resistor 22 a value of approximately 160 ohms, and the resistor R2 may have a total resistance of approximately 5000 ohms. However, the amount of the resistance of R2 in circuit may be adjusted by means of a slide wire contact 29.

If the temperature of the core 1 is at a certain value, the voltage E2 across the resistor R2 will be proportional to the current in the coil winding 5, and will be equal to the voltage across resistor R1 less the voltage across resistor 22. As the temperature of the magnet core 1 rises, the temperature of resistor 22 will rise. Since the resistor 22 has a positive temperature coefficient of resistance, less of the current in the coil winding 5 will flow through resistors 22 and R2 to ground when the temperature of the magnet core 1 is high than when it is low. Therefore, by using the proper values of resistance for R1, R2, and 22, the output voltage across resistor R2 can be made to be linearly proportional to the force 14. The output voltage E, across resistor R2, may be expressed thusly:

$$E = \frac{I \text{ coil } R1 R2}{R22 + R2 + R1}$$

where I is the current in the coil 5.

Since the output voltage E is linearly proportional to the force 14, even though the temperature of the core changes, the output may be delivered to a receiver 30 which may be a recorder, regulator or a combination recorder and regulator or other device, and will be a true measure of the force 14.

Figure 3:
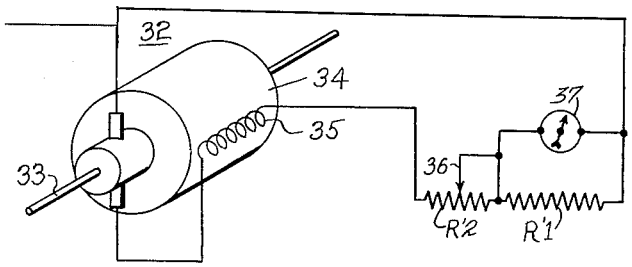
FIG. 3 is a view of another form of device embodying automatic temperature compensation for changes in strength of the field of a permanent magnet embodied therein.

The temperature compensating system disclosed in FIG. 1 and FIG. 2 may also be embodied in other devices, such for example as the electromagnetic tachometer 32 shown in FIG. 3. The resistance circuit embodied in FIG. 3 is such that the output voltage of the tachometer will be proportional to the r.p.m. of the tachometer shaft 33 even though the termperature of the permanent magnet 34 increases so as to weaken its field strength. The resistance circuit of FIG. 3 includes a resistance 35 having a negative coefficient of resistance in thermal conductive relation to the magnet and resistors R'1 and R'2. The resistor R'2 is adjustable by means of a slide contact 36. As shown resistors 35, R'2 and R'1 form a closed series circuit across the tachometer armature. As the temperature of the magnet rises and its field weakens, the resistance of resistor 35 decreases so that the current is not diminished at a given magnet temperature and rotational speed of the armature. Thus the voltage across R'1 is compensated for the decrease in generated voltage at any r.p.m. of shaft 33. By measuring the voltage across R'1 with a meter 37, the r.p.m. of the shaft 33 will be correctly indicated, even though the generated voltage has decreased because of the loss of strength of the magnet.

Having thus described the invention, it will be apparent to those of ordinary skill in the art to which the invention pertains, that the illustrated embodiments are subject to modification without departing from either the spirit or the scope of the invention.

Therefore, what is claimed as new and desired to be secured by Letters Patent is:

1. An electromagnetic apparatus comprising a permanent magnet, a coil winding disposed in flux linking relation with that magnet, said winding being adapted to be actuated by a means responsive to a variable condition, means yieldably supporting said coil winding, a differential transformer having a core movably connected to said coil winding, and a magnet resistor in thermally conductive relation to said permanent magnet, the magnet resistor having a positive temperature coefficient of resistance whereby the resistance thereof varies with the temperature of the permanent magnet, means for converting the output of said differential transformer into a direct current, a closed parallel resistance circuit which includes said magnet resistor and at least two external resistors, one terminal of one of said resistors being connected to the junction of one of said resistors and said magnet resistor, said magnet resistor so modifying the division of current flow through said resistors that the voltage across one of them is substantially linearly proportional to the force exerted by said coil winding in the field of said permanent magnet.

2. Apparatus as in claim 1 in which the magnet member resistor has a positive temperature coefficient of resistance.

3. The combination with an electromagnet device comprising a core, a coil winding in flux linkage relation therewith and movable relative to the core, said coil winding being adapted to be positioned relative to the core by means responsive to a variable condition, means yieldably supporting said winding, and a resistor in thermo-conductive relation with said core, said resistor having a coefficient of resistance that varies with the temperature of the core, of a differential transformer having a core operatively connected to said coil winding for developing a voltage output in accordance with the motion of said winding, means for converting said voltage to a direct current output, said output being connected to said coil winding, first and second resistors connected by a common connection at corresponding terminals and at the other terminals by said magnet core resistor, the coil winding being connected to the junction of said core resistor and one of said first and second resistors, whereby the current in the coil winding is divided among said resistors in accordance with the temperature of the core and thereby producing a voltage across one of said first and second resistors that is substantially directly proportional to the force exerted by said coil winding.

4. The combination as in claim 3 in which the first resistor is of a fixed relatively low value, and the second is adjustable but of a high value relative to the first resistor, the voltage across the second resistor being substantially linearly proportional to the current in said coil winding.

5. The combination as in claim 3 in which the magnet resistor has a positive temperature coefficient of resistance.

6. In combination with an electromagnetic device having a permanent magnet field member and a movable member for generating an output voltage whose magnitude decreases as the field of the magnet member decreases in response to its being heated, of a closed resistance circuit for measuring the voltage output of said device and so modifying the same that the voltage output is proportional to the motion of the movable member relative to said magnet member, said closed resistance circuit comprising a resistor having a coefficient of resistance that varies with the temperature thereof and which is responsive to the temperature of the magnet member, a first and a second resistor connected to form a closed series loop with said resistor having a temperature coefficient of resistance, the voltage of said device being impressed across the junctions of the temperature responsive resistor and the first resistor and the junction of the first and second resistors, and a voltage responsive means connected across one of said first and second resistors for measuring the output of said device.

7. In an electric tachometer having a permanent magnet field member and an armature rotatable in the field thereof and adapted to be driven by a member whose rotational speed is to be measured, means responsive to the voltage output of the armature and responsive to the temperature of the magnet member for so modifying the output of the armature that the magnitude thereof is directly proportional to the rotational speed of the armature, said means comprising a closed resistance loop having an output measuring resistor, an adjustable resistor and a resistor whose resistance varies with the temperature of the magnet member, the temperature-responsive resistor so adjusting the flow of current through the fixed and adjustable resistors that the voltage across the measuring resistor is directly proportional to the rotational speed of the tachometer.

(References on following page)

References Cited in the file of this patent

UNITED STATES PATENTS

| | | | |
|---|---|---|---|
| 1,411,311 | Sullivan | Apr. 4, | 1922 |
| 1,903,685 | Planiol | Apr. 11, | 1933 |
| 1,999,347 | Urfer | Apr. 30, | 1935 |
| 2,112,542 | Myers | Mar. 29, | 1938 |
| 2,347,563 | Keller | Apr. 25, | 1944 |
| 2,685,200 | Slottow | Aug. 3, | 1954 |
| 2,780,101 | Kinkel | Feb. 5, | 1957 |
| 2,788,664 | Coulbourn | Apr. 16, | 1957 |
| 2,885,604 | Stavrinaki | May 5, | 1959 |

FOREIGN PATENTS

| 456,947 | Great Britain | Nov. 18, 1936 |
|---|---|---|

UNITED STATES PATENT OFFICE
CERTIFICATE OF CORRECTION

June 13, 1961

Patent No. 2,988,673

Robert E. Harkins

It is hereby certified that error appears in the above numbered patent requiring correction and that the said Letters Patent should read as corrected below.

In the grant, lines 1 to 3, for "assignor to Hagen Corporation, of Pittsburgh, Pennsylvania, a corporation of Pennsylvania," read -- assignor to Hagan Chemicals & Controls, Inc., a corporation of Pennsylvania, --; line 12, for "Hagen Corporation, its successors" read -- Hagan Chemicals & Controls, Inc., its successors --; in the heading to the printed specification, lines 3 to 5, for "assignor to Hagen Corporation, Pittsburgh, Pa., a corporation of Pennsylvania" read -- assignor to Hagan Chemicals & Controls, Inc., a corporation of Pennsylvania --

Signed and sealed this 23rd day of January 1962.

(SEAL)
Attest:

ERNEST W. SWIDER
Attesting Officer

DAVID L. LADD
Commissioner of Patents